July 15, 1969  J. S. JACKSON  3,455,437
ENDLESS-BELT CONVEYORS
Filed July 24, 1967  4 Sheets-Sheet 1
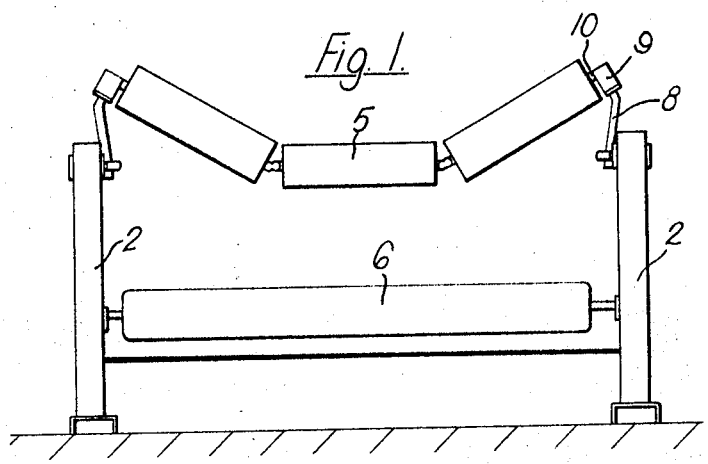
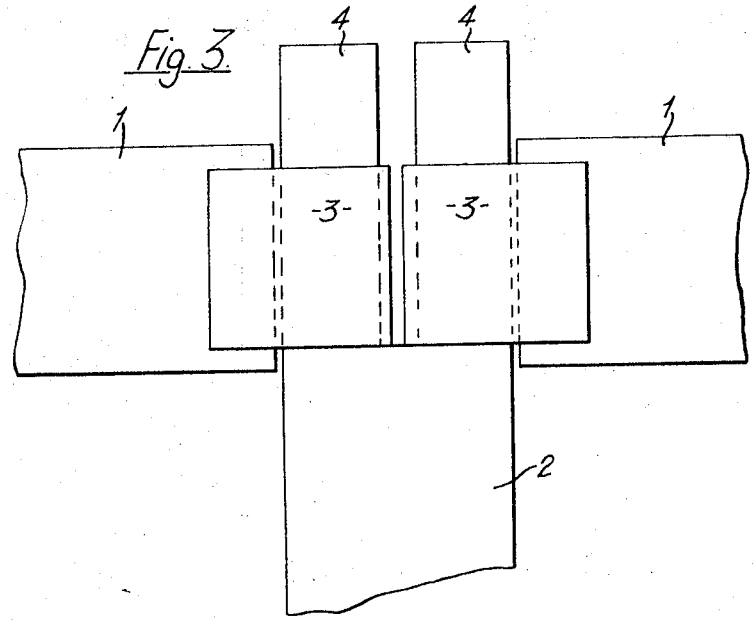
Inventor
JAMES S. JACKSON
By
Mason, Fenwick & Lawrence
Attorneys

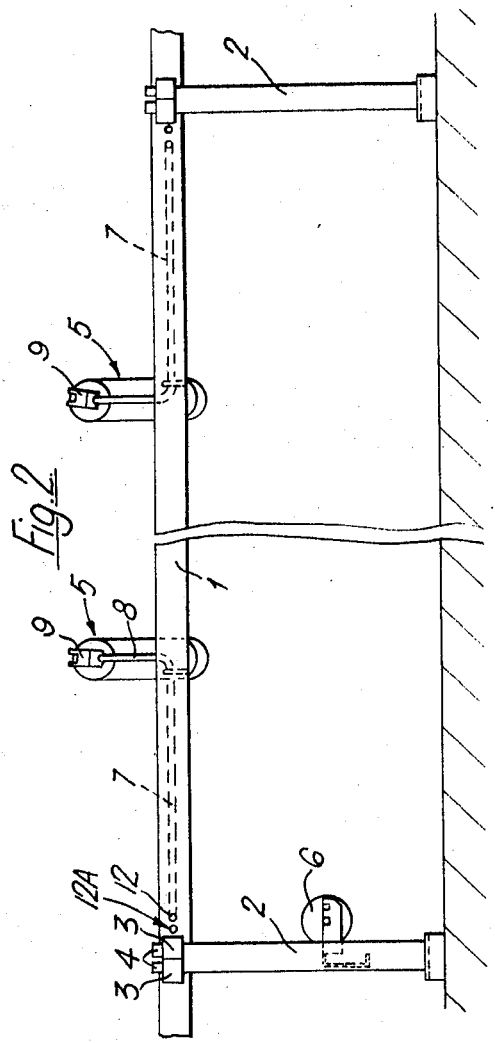

July 15, 1969  J. S. JACKSON  3,455,437
ENDLESS-BELT CONVEYORS

Filed July 24, 1967  4 Sheets-Sheet 4

Inventor
JAMES S. JACKSON
By Mason, Fenwick & Lawrence
Attorneys

United States Patent Office
3,455,437
Patented July 15, 1969

3,455,437
ENDLESS-BELT CONVEYORS
James S. Jackson, Glasgow, Scotland, assignor to Mavor & Coulson Limited, Glasgow, Scotland, a British company
Filed July 24, 1967, Ser. No. 655,445
Claims priority, application Great Britain, Aug. 4, 1966, 34,957/66
Int. Cl. B65g 15/08
U.S. Cl. 198—192                   8 Claims

ABSTRACT OF THE DISCLOSURE

In an endless-belt conveyor in which the upper run of the belt runs over troughing idler rollers, variation of the troughing angles of the rollers with varying loads on the upper run of the conveyor is enabled by mounting the ends of the rollers on arms of torsion bars.

---

This invention relates to an endless-belt conveyor of the type in which the belt in its upper run passes over troughing idler rollers which are spaced longitudinally of the conveyor and are attached at their opposite ends to supports spaced laterally of the conveyor, provision being made for the troughing angle of the rollers to vary with a varying load on the belt with a view to reducing spillage.

According to the present invention we provide, for use in a conveyor of the type aforesaid, a support for one end of a troughing roller including a torsion bar having an arm for mounting said end of the roller so as, in use to permit the troughing angle of the roller to vary under a varying load.

Preferably, said support comprises a runner which, in use extends along one side of the conveyor and supports the torsion bar, the torsion bar extending longitudinally of the runner, and having one end fixed to the runner against torsional movement, and having its said arm upstanding.

Preferably also, said end of the torsion bar is fixed against torsional movement by a second arm on the bar passing through a hole or holes in the runner.

Preferably also, the said arms are formed integrally with the torsion bar.

Futher, accordingly to the present invention we provide a frame for a conveyor of thet ype aforesaid comprising laterally spaced supports carrying longitudinally spaced pairs of opposed torsion bars fixed at one end thereon against torsional movement at that end and having arms for supporting the opposite ends of troughing rollers so as, in use, to permit the troughing angles of the rollers to vary under a varying load.

An embodiment of the invention will now be described, by way of example, with reference ot thre accompanying drawings, in which:

FIG. 1 is an end view of a conveyor frame according to the present invention,

FIG. 2 is a side view corresponding to FIG. 1,

FIG. 3 is a detail view to an enlarged scale,

Figure 4:
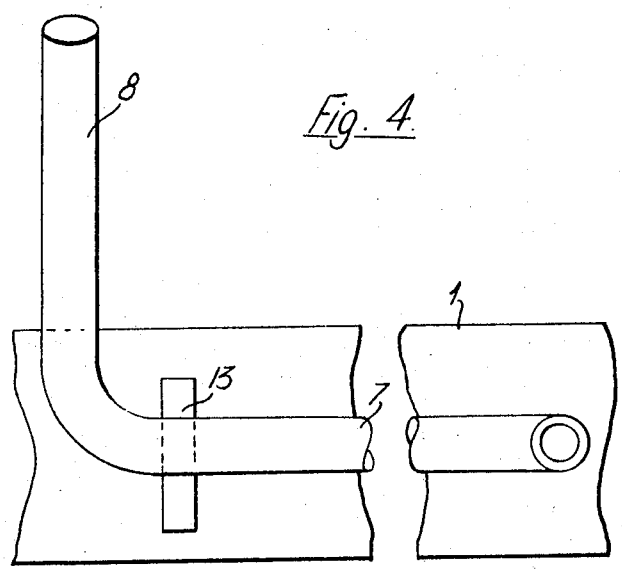
FIG. 4 is a side view showing a portion of a support, and a torsion bar.
Figure 5:
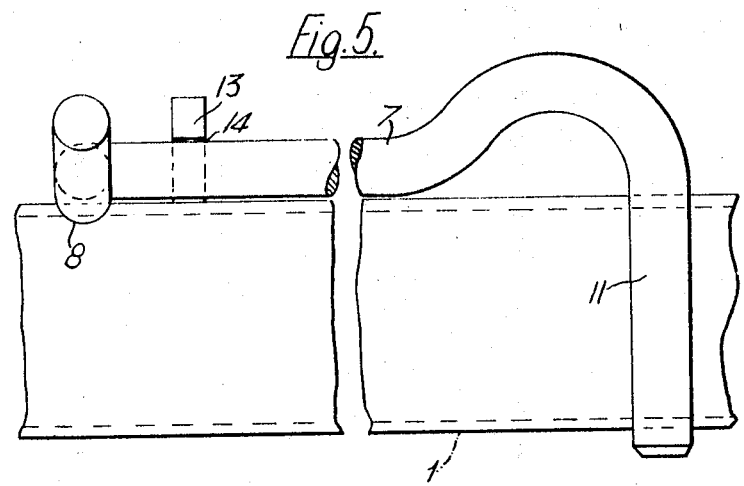
FIGS. 5 and 6 are respectively plan and secitonal end views corresponding to FIG. 4.

A frame for a conveyor of the type aforesaid consists of laterally spaced parallel supports in the form of tubular runners 1, sometimes called stringers, and mounted end-to-end at each side of the frame on uprights 2, sometimes called stools. The runners 1 have at their ends sockets 3 which fit on to spigots 4 on the upper ends of the uprights 2 so that runners 1 can be easily attached and detached. The runers 1 support a series of longitudinally spaced troughing idler rollers 5 for the upper run of an endless belt, not shown, and rollers 6 for the return of the belt are supported on the uprights 2. Each runner 1 carries at each end a torsion bar 7 and one of these will now be described.

The torsion bar 7 extends longitudinally of the runner 1, externally thereof and to the side nearer the roller 5. The bar 7 has an upwardly directed arm 8 which at its upper end fits into a socket in a bracket or end-piece 9 on the end of the shaft 10 of the roller 5. The bar 7 has at its other end a second arm 11 which is directed at right angles to the arm 8, and the arm 11 passes through holes 12, FIG. 6, in opposite sides of the runner 1, so that that end of the bar 7 is fixed against torsional movement. The bar 7 adjacent its arm 8 is supported in a bracket 13, shown best in FIG. 6, having an upwardly open slot 14 in which the bar 7 rests. The bar 7 can thus be attached to the runner 1 by inserting the arm 11 through the holes 12 and then swinging the bar 7 down into the slot 14. Thus, each roller 5 is mounted on the arms 8 of an opposed pair of torsion bars 7, and the troughing angle of each roller 5 can vary with a varying load on the upper run of the belt, due to the torsional resilience of the bar permitting the arms 8 to swing inwards towards each other. It will be understood that when the load decreases the arms 8 move outwards and the troughing angle decreases The brackets 9 are preferably angled relative to the arms 8 so as to be slightly inclined rearwardly out of the vertical, as shown in FIG. 2, so that the general plane of the three rollers forming the troughing roller 5 is correspondingly inclined. This inclining of the rollers 5 assists in reducing any tendency for the belt to move off-centre of the rollers, and for this purpose, one arm 8 of an opposed pair may also or alternatively be located slightly further along its runner than the other. To enable this, each runner 1 is provided at each end with a further set of holes 12A, FIG. 2 in which the arm 11 of one bar 7 of an opposed pair may be placed.

Figure 6:
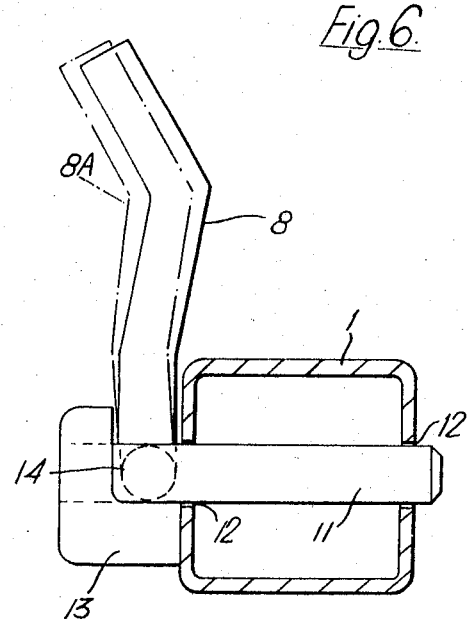

In FIG. 6, the arm of the bar 7 is shown in chain-dotted lines at 8A in a position it may adopt to permit varying of the troughing angle of the roller 5.

It will be understood that the torsion bars 7 also provide some resilience when large lumps are being conveyed on the belt.

In a modification of the embodiment above described, the torsion bars 7 are vertical and their arms 8 are horizontal, and the brackets 9 are appropriately attached to the arm 8. However, the arms 8 may have vertical extions for mounting the brackets 9. The holes 12 and 12A may be connected by a slot and additional supporting brackets 13 may be spaced along the bar 7.

I claim:

1. A frame for an endless-belt conveyor in which the upper run of the belt passes over troughing idler rollers which are spaced longitudinally of the conveyor and are attached at their opposite ends to a frame comprising supports spaced laterally of the conveyor, provision being made for the troughing angle of the rollers to vary under varying loads on the belt, in which said supports comprises parallel runners, longitudinally spaced pairs of opposed torsion bars mounted on the runners and fixed at one end on the latter against torsional movement at that end, and arms on the torsion bars for supporting the opposite ends of the troughing rollers.

2. A frame according to claim 1, in which said laterally spaced supports include uprights on which the parallel runners are mounted by spigot and socket joints.

3. A frame according to claim 2, in which said torsion bars extend longitudinally of said runners and said arms are upstanding.

4. A frame according to claim 1, in which means for fixing said end of each torsion bar comprises a second arm on the torsion bar and located at said end, and a hole in said support into which said second arm is inserted.

5. A frame according to claim 1, in which each arm is formed integral with its torsion bar.

6. A frame according to claim 3, in an endless-belt conveyor in which the belt passes over troughing idler rollers in which means for mounting said troughing rollers are mounted on said upstanding arms and comprise shafts on which the rollers are rotatable, end pieces on said shafts, and sockets in said end pieces into which the ends of the upstanding arms fit.

7. A frame according to claim 2 in an endless-belt conveyor in which the belt passes over troughing idler rollers, and in which the frame includes return rollers for the endless-belt mounted on said uprights.

8. In an endless-belt conveyor in which the upper run of the belt passes over troughing idler rollers which are spaced longitudinally of the conveyor and are attached at their opposite ends to a frame comprising supports spaced laterally of the conveyor, provision being made for the troughing angle of the rollers to vary under varying loads on the belt; the improvement that said supports comprises parallel runners, longitudinally spaced pairs of opposed torsion bars mounted on and extending longitudinally of said runners, means on said runners defining transverse holes, first arms on said torsion bars at one end thereof and inserted in said holes and fixing said ends of the torsion bars against torsional movement at said ends, second upstanding arms on said torsion bars at the other ends thereof, and means mounting said rollers at their ends on said upstanding arms.

References Cited

FOREIGN PATENTS 861,000    2/1961    Great Britain.

OTHER REFERENCES

Mechanical Handling, February 1967, p. 43A.

EDWARD A. SROKA, Primary Examiner